Jan. 16, 1968  F. H. FLAM  3,364,339
MATCH POINT DUPLICATE BRIDGE SCORER
Original Filed Oct. 21, 1957  3 Sheets-Sheet 1
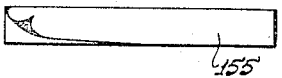
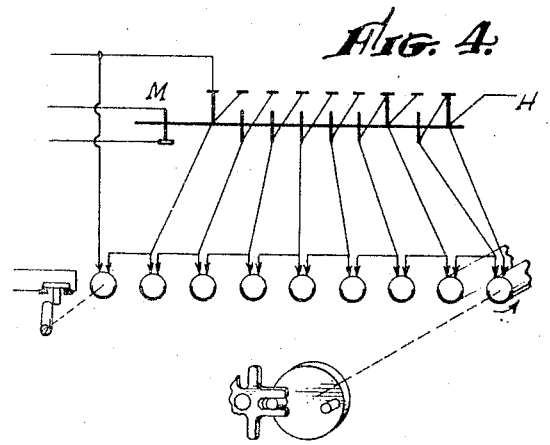
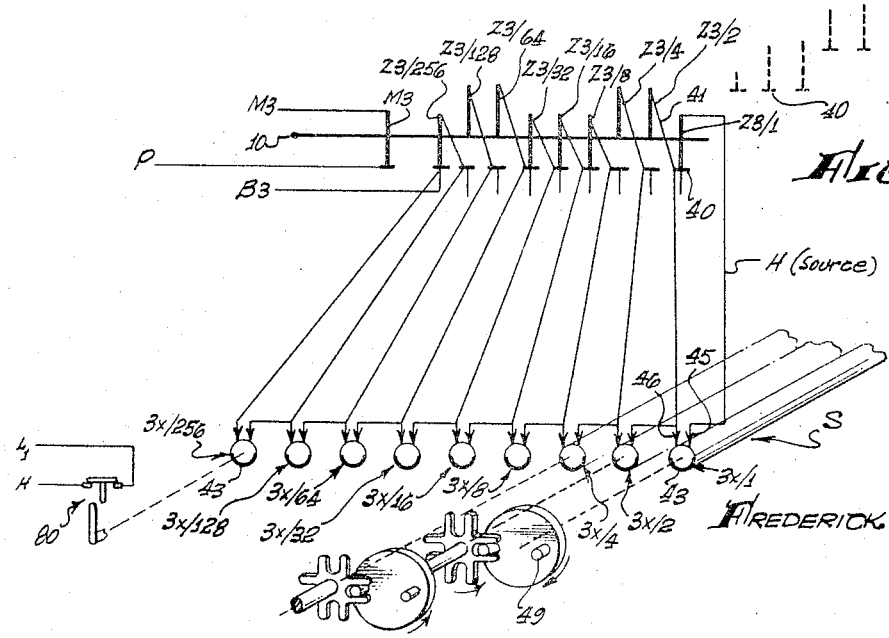
FREDERICK H. FLAM,
INVENTOR.
By Flam and Flam
ATTORNEYS

FREDERICK H. FLAM,
INVENTOR.

By Flam and Flam
ATTORNEYS.

Jan. 16, 1968
F. H. FLAM
3,364,339
MATCH POINT DUPLICATE BRIDGE SCORER
Original Filed Oct. 21, 1957
3 Sheets-Sheet 3
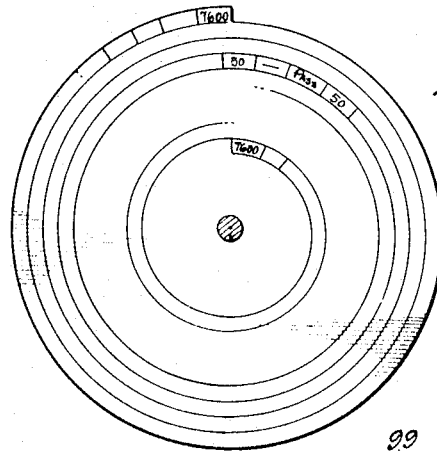
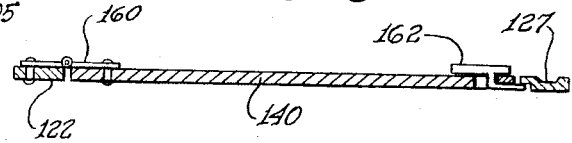
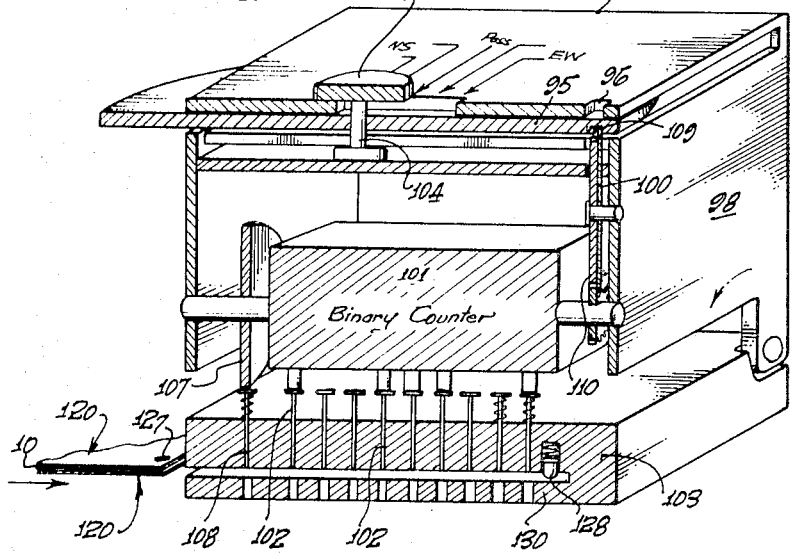
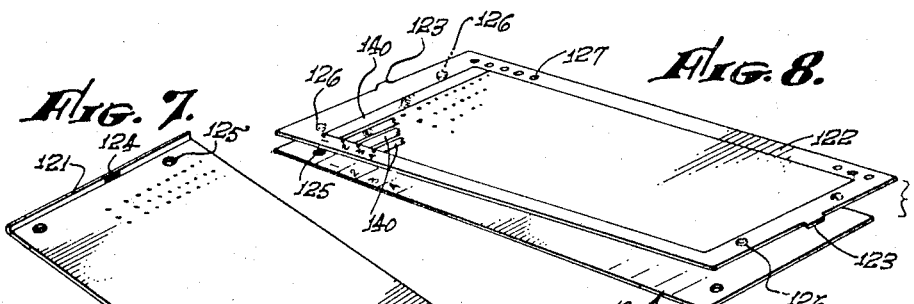
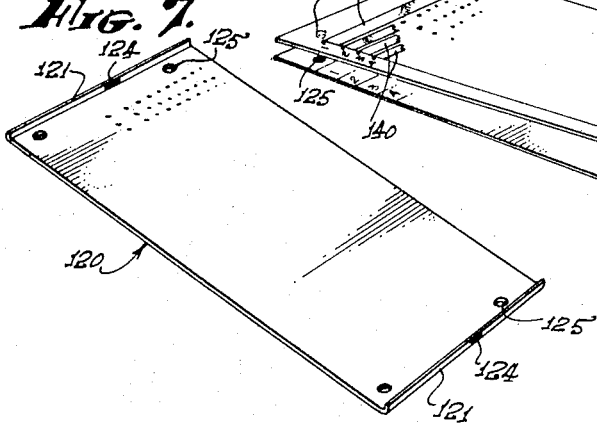
FREDERICK H. FLAM,
INVENTOR.
By Flam and Flam
ATTORNEYS.

United States Patent Office 3,364,339
Patented Jan. 16, 1968

3,364,339
MATCH POINT DUPLICATE BRIDGE SCORER
Frederick H. Flam, 4510 Callada Place,
Tarzana, Calif. 91356
Original application Oct. 21, 1957, Ser. No. 691,414, now Patent No. 3,044,693, dated July 17, 1962. Divided and this application Jan. 2, 1962, Ser. No. 163,390
2 Claims. (Cl. 235—61.12)

This invention is a division of my application Ser. No. 691,414, filed Oct. 21, 1957, and entitled, Match Point Duplicate Bridge Scorer, now Patent No. 3,044,693, issued July 17, 1962.

This invention relates to contract bridge, particularly duplicate bridge.

The vast majority of duplicate bridge tournaments are scored on the so-called match point basis.

In match point duplicate bridge, the object is to obtain by skill or luck a score with given cards better than other competitors. After the play of each hand is concluded, the cards are placed, as originally dealt, in a duplicate board, and passed on for play by the other competitors. Usually about twenty-six boards are played. Each board is valued equally.

The match point score for a team on any board is equal to the number of teams playing the same hands that obtain a poorer score, and one-half the number of teams playing the same hands that obtain the same score. Chart I demonstrates a typical match pointed score sheet.

CHART I

| Team | Contract | Opposite Team | Board 18 | | Match Points |
|---|---|---|---|---|---|
| | | | N-S Plus | E-W Plus | |
| 1 | 4HN+5 | 10 | 650 | | 9 |
| 2 | 2NN+4 | 12 | 180 | | 2 |
| 3 | 3CW$x$−4 | 14 | 700 | | 12 |
| 4 | 3NN+4 | 16 | 630 | | 6½ |
| 5 | 3NS−1 | 1 | | 100 | ½ |
| 6 | 3NN−1 | 3 | | 100 | ½ |
| 7 | 3NN+5 | 5 | 660 | | 11 |
| 8 | 4HN+5 | 7 | 650 | | 9 |
| 9 | 4HN+4 | 9 | 620 | | 4½ |
| 10 | | | | | |
| 11 | | | | | |
| 12 | | | | | |
| 13 | | | | | |
| 14 | 4HN+4 | 2 | 620 | | 4½ |
| 15 | 3NN+4 | 4 | 630 | | 6½ |
| 16 | 3HN+5 | 6 | 200 | | 3 |
| 17 | 4HN+5 | 8 | 650 | | 9 |
| 18 | | | | | |
| Total | | | | | 78 |

This score sheet "travels" with the board, and the players, after completing the play of a hand, supply the information. The tournament director or scorer assigns match points after the tournament is completed.

Adding up the scores at the end of a tournament is a tedious task. The first job is assigning match point scores to each of the teams on the separate score sheets. An opportunity for mistake arises because one score can readily be overlooked when match points are assigned. The arithmetical check for accuracy is that the sum of the match points on any board is:

$$\text{Sum of } X = 1+2+3 \ldots (n-1) = \frac{(n-1)(n-2)}{2}$$

where $n$ equals the number of teams playing the particular board. If thirteen teams play, the check total is 78. After each board is match pointed, the match point scores are transferred to a so-called "recap" sheet. The possibility of error arises in transferring the numbers. The match point scores for each team is added and carried to a total column. As a check, the grand total of the match points must be:

$$\text{Sum of } y = (\text{Sum of } X)(N)$$

N equals the number of boards in play. In the present example, this total will be 2652.

It can readily be appreciated that this scoring task is difficult to do correctly; and it must be done correctly because a tournament may be decided by one-half of a match point, and often is. A good scorer may complete the task in one hour. Two hours is not uncommon for a scorer whose powers of concentration are less than 100%.

In a large bridge tournament, a tremendous staff and consequently a tremendous payroll is required in order to complete the scoring task. As a rule, one person is assigned to each section of from thirteen to eighteen tables for purposes of direction, as well as scoring. If the scoring task could be simplified, only a few directors would be required to direct twenty or more sections.

Unquestionably there is and has been, ever since the beginning of tournament bridge, a very pressing need for a match point scoring machine. The primary object of this invention is to provide such a machine.

Not only does the present invention involve substantial economic savings, but it also means that impatient players will not be required to wait long and anxious hours to know the results of a tournament.

The possible match point bridge scores range from minus 7600 (down thirteen vulnerable and redoubled) to plus 7600. The possible results are numerous. Yet the results must be supplied to a memory device.

It is crucial that the players themselves be able to supply the varied information regarding their score to a card or the like. The apparatus for doing this is small and compact, whereby it may be located on a card table in a manner so that there is neither inconvenience nor interference. Furthermore, it is desirable to provide a simple, portable mechanical device for this purpose since electrical operation at the table would involve special facilities. Another object of this invention accordingly is to provide such a device.

There are only about four hundred possible scores in a match point game, although the score difference may be fifteen thousand, two hundred.

Another object of this invention is to provide a simple mechanical arrangement whereby this amount of significantly different information may be applied to a punch card, or the like.

Another object of this invention is to provide simple apparatus, involving only circuit controllers, relays and a simple mechanical device whereby the match point score is provided for all teams merely by passing the cards through the machine.

Still another object of this invention is to provide a simple fool-proof device, including counters for automatically match pointing the tournament results.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 illustrates a punch card to which score information has been applied;

FIG. 2 is a diagrammatic view of one of a number of parts of a box into which the card is inserted;

FIG. 4 is a view similar to FIG. 2, illustrating the box for East-West scores;

FIG. 5 is a plan view of a punch dial plate;

FIG. 6 is a diagrammatic view of the punch mechanism;

Figure 3:
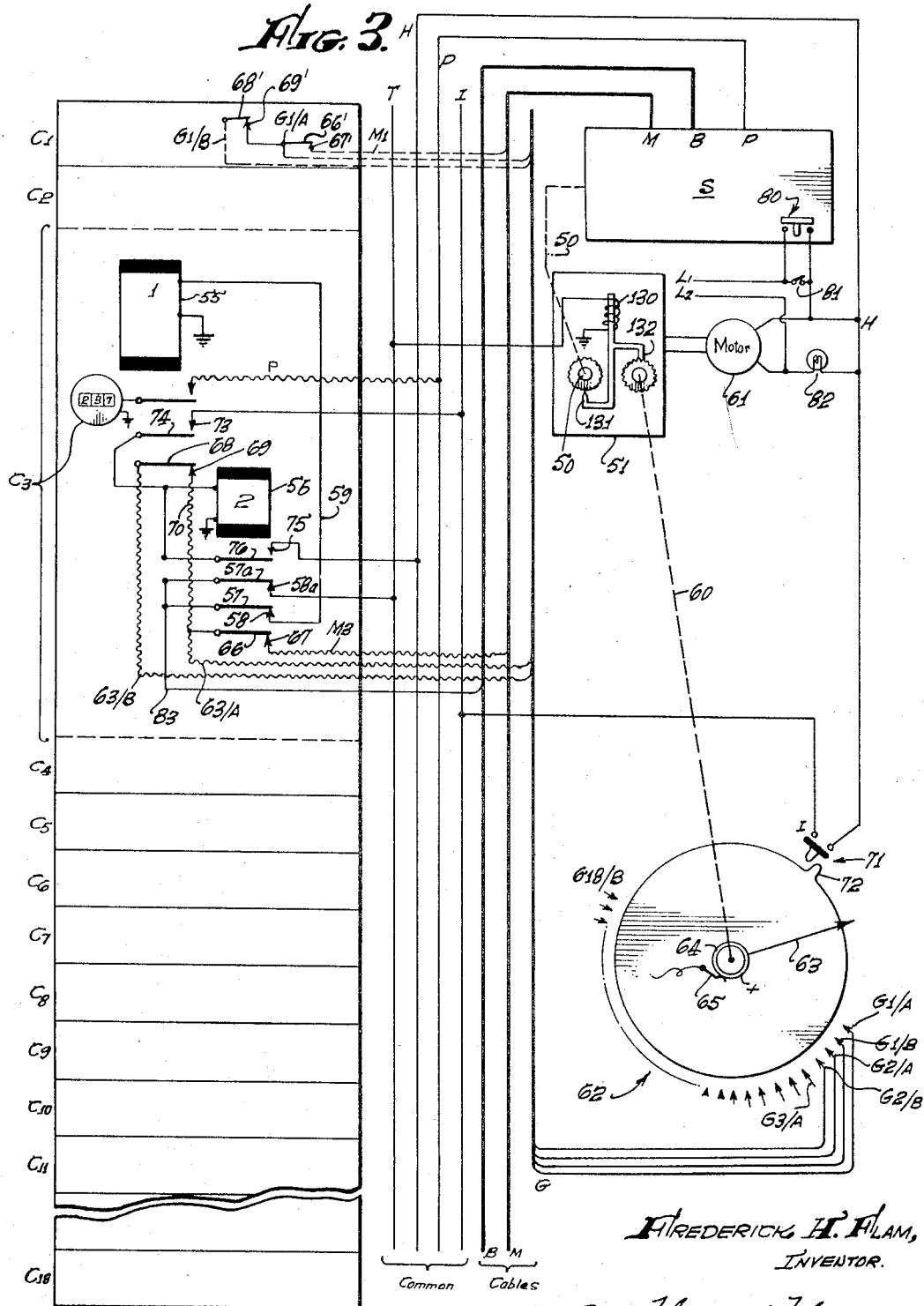
FIG. 3 is a diagrammatic representation of the scoring machine.

FIGS. 7 and 8 respectively diagrammatically illustrate companion parts of a card holder; and FIG. 9 is a sectional view taken longitudinally of one of the tabs shown in FIG. 8 and illustrating in detail a typical hinge and releasable latch for the tab.

In FIG. 1. there is illustrated a punch card 10 corresponding to a particular board. The top half of the card carries numbers 1 to 18 corresponding to the number assigned to the North-South teams, and the lower half carries the numbers corresponding to the East-West teams. It may be noted that, in the usual tournament, there are two sets of competitors: those who play the North-South cards, and those who play the East-West cards. Columns 20 and 21 provide spaces for the scoring team to write, opposite its number, the contract and the result. Similar columns provide spaces for the scoring team to write, opposite the opposing team number, its result.

A column 22 provides a space for application of punch hole information applied to the card in a manner to be set forth hereinafter. The first column of punch holes exist whenever a score is registered. The next nine columns 23 carry information corresponding to the result obtained. There are about 400 possible results. The difference between the score is immaterial; only the rank in the scale of results is significant. A binary system is used to denote rank only in the scale of possible results. The higher the score, the higher the rank. The highest rank is assigned to the maximum match point score of +7600. Since there are about 400 different score results, this can be denoted in the binary system in which nine important elements are used, corresponding to 1, 2, 4, 8, 16, 32, 64, 128 and 256, any of which are to be added to correspond to the rank. The right-hand column corresponds to the units, and the left-hand column of the set 23 corresponds to 256.

In the scale of possible results, reading only the punch hole marks, North-South team #1 ranks relatively at 256, plus 32, plus 16, plus 4, or 308. North-South team #2 ranks at 256, plus 8, 4 and 1, or 269. And team #3 ranks at 256, 64, 32, 16, 8 and 1, or 377. Comparing the punch holes for teams #7 and #8, it will be obvious that team #7 just outranks team #8, the difference between the punch hole markings being merely one unit, 660 and 650 being adjacent scores in the scale of possible duplicate scores.

Since nine bits allow for $2^9$ or 512 possible combinations, and only about four hundred are necessary, the scale is centered at the intermediate score of a passout result. The passout result is assigned a value of 256 in the relative scale of possible results, and nothing is assigned to the value of 255 in a manner to be described hereinafter.

In FIG. 2, there is diagrammatically illustrated, one section of a punch card reading box into which each card 10 is inserted one at a time and in any order. Each card is scored, and the operation of the machine will be described in connection with a typical card, such as for board 18 illustrated in FIG. 1. Illustrated is the station corresponding to team #3. Ten pins Z3/1, Z3/2, Z3/4, Z3/8, Z3/16, Z3/64, Z3/128, Z3/256 and M3 are aligned with the possible positions of punch holes. Contacts 40 are engaged by the pins Z if the punch card 10 permits. If all of the pins are in engagement, corresponding to the highest score (actually beyond the scale of possible results), the pins connect serially to supply voltage to a lead B3. Diagonal connection lines 41 illustrate the connections between contacts 40 and the next adjacent pins. These connections are illustrated in this manner in order to simplify the understanding of the circuitry; however, it will be understood that these connections 41 actually pass about one edge of the card.

A sweeping switch mechanism S shorts out adjacent contacts 40 on binary sequence in order to find the ranking score. Thus, in the position illustrated, the lead B3 is not connected to the voltage source, all of the switch segments 43 of the rotary switch elements $3x$ being out of engagement with their contact sets 45-46, and the pins Z3/2 and others interrupting the serial connection. As the switch mechanism operates, first, the conductive segment 43 for the first switch element $3x/1$ bridges pin Z3/1 to Z3/2, making actual engagement of the pin Z3/1 with its contact unnecessary for completion of a circuit to B3. Secondly, the segment on switch element $3x/1$ disengages contacts 45 and 46 and the segment on element $3x/2$ moves upwardly, and bridges pin Z3/2 to Z3/4. This carries the circuit to pin Z3/4, but the circuit is here interrupted because of the absence of a punch hole for pin Z3/4. The fact that the conductive element on switch element $3x/1$ moves out of engagement is immaterial, because the hole in the card 10 establishes this part of the circuit in any event. At the third position of the switch mechanism, both elements $3x/1$ and $3x/2$ bridge their corresponding pin structures; at the fourth position, only elements $3x/4$ bridge contacts; etc.

Obviously, the switch mechanism S essentially counts in binary numbers, and a two to one transmission ratio exists between each adjacent rotary switch element. Preferably an intermittent movement is used, one-half revolution of one switch element resulting upon downward movement of the conductive element of the preceding switch element. This may be accomplished by a Geneva wheel combination in which each wheel has four slots engageable with two pins 49 of a drive associated with the previous wheel.

Utimately, the switch mechanism arrives at a position in which elements $3x/128$, $3x/64$, $3x/8$, $3x/4$ and $3x/1$ are operative; that is, after 128, plus 64, plus 8, plus 4, plus 1 revolutions, and the remainder are inoperative. By tracing the circuits, it is obvious that only pin Z3/2 prevents a circuit to line B3. At the next position of the switch mechanism, element $3x/2$ will operate, and a circuit will result.

A set of pins similar to Z3/1 to Z3/256, together with corresponding switch segments are provided for each team row, making a total of eighteen sets for the North-South field. The switch mechanisms operate simultaneously by virtue of the rotation of a common mounting for the corresponding switch segments. The conductive segments 43 of each switch element are spaced axially along a single rod passing beneath all rows of pins. The greater the rank, the less are the revolutions of the switch mechanism required to complete the B connection. Hence, a circuit is first established at the B connection for the team ranking highest in the scale of possible scores because the highest rank requires the least number of counts by the sweeping switch mechanism S.

In FIG. 3, there is diagrammatically illustrated the sensing box in which the switch mechanisms and pins Z are contained.

The mechanism illustrated in FIG. 3 assigns match points according to relative rank in this manner: two points for each score beaten, and one point for each score tied. This differs from conventional scoring by a factor of 2, and a constant of 1. What in the past was a match point score of 12 becomes 25 ($2 \times 12 + 1$). This makes no essential difference, match points by the mechanism being readily convertible to conventional match points.

A drive shaft 50, supplied from an alternate lockout transmission 51 causes the switch mechanism S to sweep through its range of values (0 to 511).

Each team number has assigned to it a decimal pulse counter C1, C2, C3, etc., together with an appropriate relay circuit. The counters cumulate the match points assigned by the mechanism. The counters and circuits are all illustrated in block form, except the counter and circuit for team #3.

Each circuit includes two relays 55 and 56 that are normally deenergized. Since team #3 has the highest score, the lead B3 will be the first to be energized by the sensing box and sweeping switch S. Lead B3 causes energization of the first relay 55 through an arm 57 and a back contact 58 of the second relay 56, a lead 59 being illustrated for this purpose.

The B3 circuit simultaneously stops the shaft 50 so that the switch mechanism S holds its position when the relay 55 is energized. Lead B3 connects to another arm 57a of the second relay, and a common trip line T connects to the back contact 58a engaged thereby.

The trip connection T operates a solenoid 130 which locks shaft 50 and releases an alternate drive shaft 60 quickly upon energization thereof. A simple planetary or other differential transmission, driven by a motor 61 operates both shafts 50 and 60 depending upon which one is free. The solenoid 130 carries two fingers 131 and 132. One finger 132 engages a ratchet formed on the shaft 60 only when the solenoid is unenergized, and the other finger 131 engages a ratchet formed on the shaft 50 only when the solenoid is energized.

The first relay 55 places the counter C3 in circuit to a common pulse line P. Pulses are supplied to the line by the aid of a pulse device 62 operated by the shaft 60.

Each counter relay circuit for each team has two gates G1/A, G1/B, etc. on pulse device 62 engaged in sequence by a rotating arm 63 operated by the shaft 60. A slip ring 64 engaged by a brush 65 supplies the arm with appropriate voltage, preferably direct current. As the arm 63 engages gate G1/A, a pulse is supplied to the pulse line P as follows: an arm 66' corresponding to arm 66 of relay 56, but in the C1 circuit, back contact 67' in circuit for C1 correspoding to 67 in the C3 circuit, to main gate M1 (corresponding to M3 in FIG. 2) to the common pulse line P. This supplies a pulse to counter C3, now connected to the pulse line.

As the arm 63 engage gate G1/B, a pulse is supplied to the pulse line P via an arm 68' in the C1 circuit corresponding to arm 68, a contact 69' corresponding to contact 69, a lead, corresponding to lead 70, its main gate M1 to the pulse line. The arm 63 as it continues its cycle, similarly causes pulses in the pulse line P for all other teams, the relay circuits of which are entirely deenergized, corresponding to teams who played the hand (as determined by their main gates M). Twelve sets of two pulses (or 24 pulses) are so supplied in the example under consideration. One extra pulse, making a total of 25, is supplied by gate G3/A for the very circuit of the counter under consideration.

The companion gate G3/B is out of circuit by virtue of the fact that the relay 55 for the counter C3 is operative, contact 69 and arm 68 interrupting this circuit.

As the arm 63 completes its cycle, an interrupter switch 71 is momentarily engaged, as by a cam 72 that rotates with the arm 63. This supplies voltage to a common interrupter line I, and through a front contact 73, and arm 74 of the first relay, to the second relay 56, energizing it.

As the second relay 56 is energized, it is held in engagement by a front holding contact 75 connecting to common terminal H (later to be defined), and arm 76.

The first relay 55, which is dependent upon back contact 58, is now deenergized, thereby disconnecting the counter C3 from the pulse line.

Furthermore, the gates G3/A and G3/B are disconnected from the pulse line, these gates both being dependent upon the back contact 67 to the main gate M3.

The trip connection T is now incapable of energization through the circuits associated with counter C3, the back contact 58a being disengaged. The arm 63 thus ceases rotation and the shaft 60 is locked as the solenoid 130 is de-energized. The alternate shaft 50 for the switch sweeping mechanism S is released and resumes rotation.

The interrupter switch 71 is at this time ineffective to energize any second relay corresponding to the relay 56 in the circuits for other counters. The reason for this is that the energization circuit from this interrupter switch to the second relay 56 depends upon the corresponding first relay 55 being energized. This relationship is achieved by the front contact 73 of the first relay 55. Since the first relay 55 can be energized only when the B connection is effective, the corresponding second relay 56 cannot operate in advance of the sweep switch mechanism S reaching the value appropriate for this operation.

The switch sweeping mechanism S continues as the shaft 50 is released and until another B connection is made.

As the switch mechanism S sweeps past the position at which connection B3 was first energized, nothing further occurs so far as circuits associated with counter C3 are concerned, the back contacts 58 and 58a being disengaged.

Connection B7 is the next connection to be energized, a score of +660 being next in order and the counter C7 is fed with pulses in a similar manner. However, gate G3/A is now inoperative because the second relay 56 for C3 is energized through its holding circuit. Gate G7/B is now inoperative as was gate G3/B previously. Hence, twenty-three pulses are fed to the counter C7.

Next, connections are simultaneously made to connections B1, B8 and B17, a score of +650 being next in order, and counters C1, C8 and C17 are in position to be fed by pulses. Now, however, gates G7/A are also inoperative, as are gates G1/B, G8/B and G17/B. Hence, nineteen pulses are fed to the counters C1, C8 and C17. Note that nineteen is the average of twenty-one, nineteen and seventeen, respectively, allotted to third, fourth and fifth position in the descend scale of match points for thirteen pairs.

Next connections B4 and B15 are simultaneously energized. Gates G1/A, G8/A and G17/A are now inoperative as are gates G4/B and G15/B. Hence fourteen pulses are provided to counters C4 and C15. Note that fourteen is the average of fifteen and thirteen respectively allotted to sixth and seventh positions.

Next, connections B9 and B14 are energized, and ten pulses are applied to counters C9 and C14; seven pulses to C16, five pulses to C2, and two pulses to C5 and C6.

No further B connections remain, and the switch sweeping mechanism completes its cycle and returns to the zero position illustrated in FIG. 2.

A holding switch 80 (FIGS. 2 and 3) controlled by switch S opens just prior to movement of the end switch elements 3x/256, etc. to the starting position of FIG. 2, and the motor circuit operating switch mechanism stops. The terminal H is also controlled by the switch, and the holding circuits for the second relays are likewise interrupted, and the mechanism is reset for the next card. The card is removed and another card of the set is inserted. A starting switch 81 by-passes the holding switch 80 to start the mechanism, a pilot light 82 indicating operation. The holding switch 80 closes immediately and the starting button is released, whereby the motor is returned to the control of the holding switch 80.

The digital pulse counters C are, of course, reset only after all of the cards representing the tournament section are scored. Hence, the counters C totalize the results from card to card.

Obviously, no pre-setting of the device is necessary in order properly to score the cards for any number of tables (1 to 18) and for any sequence of board play, and for any number of teams playing the board. Furthermore, the sequence in which the cards are fed through the machine is completely immaterial.

A mechanism companion to that illustrated in FIG. 3 scores the East-West part of the card 10. The same indications or punch holes are provided for the opposing East-West team opposite their numbers. Thus, East-West team #1 has punch markings the same as North-South team #5, against whom East-West team #1 played (see Chart 1). The East-West score is the complement or mirror of the North-South score in the scale of possible scores. In the example shown, East-West team #1 has the highest score; that is, this East-West team obtained the best result by actually gaining 100 points.

The reversal of values is accomplished by the pin device illustrated in FIG. 4 so that the same punchings can be used for both North-South and East-West teams. Absence of punch holes (except for the main gate M) causes adjacent contacts to be bridged rather than presence of holes. By utilizing a sweeping switch mechanism identical to that illustrated in FIG. 2, it will be obvious that the connection B (corresponding to the highest East-West score but the lowest North-South score) will be the first to be energized.

By virtue of the fact that the same punch hole system is thus used for both North-South and East-West teams, operation of the punching device is simplified.

A dial plate 95 (FIGS. 5 and 6) forming part of the punch mechanism is set to read scores marked from 7600 through zero or passout to 7600. One-half of the legends correspond to a North-South plus score, and the other half to an East-West plus score. The halves may be colored differently, or rough indicating means may show whether the score is North-South or East-West. Identical punchings made at both North-South and East-West stations, plus and minus notations being deliberately eliminated for this purpose.

The dial plate 95 carries these legends in rectangles helically arranged, starting with 7600 (North-South) at the periphery and 7600 (East-West) at the inner portion. At the center there is a blank rectangle adjacent the passout. The legends are read through a window 96 in a cover 97 mounted upon a pivoted frame 98. The dial plate 95 is carried by a spindle 104 which is guided so that it may shift laterally in the direction of arrow 105.

Rotation of the plate 95, as by knob 99 rotates a cog wheel 100 which engages slots 109 in the plate 95. The cog wheel 100 carries a gear 110 operating a binary reversible mechanical counter 101. The counter 101, instead of reading in numerals, positions heads into or out of alignment with upwardly biased punch pins 102 mounted on a support 103. The slots 109 are arranged in a corresponding spiral manner; hence, as the plate 95 rotates, successive legends are placed opposite the window 96, and the plate 95 moves laterally in accordance with the spiral tracking.

When the legend (N-S) 700 is opposite the window 96, the counter positions heads so that the correct punch holes will be provided. An auxiliary head 107 is always in alignment with punch pin 108 to provide a hole corresponding to the main gates.

When the correct legend appears, the knob is pushed down, and the punch pins are engaged, the card being appropriately located beneath the support 103.

The lateral position of the knob serves as a rough indication of the score because of the spiral arrangement of the legends and slots for the cog wheel. Hence, operation of the punch mechanism is facilitated, and careful advance scrutiny of the legends on the dial plate is unnecessary.

For calibration of the dial wheel, the slots at the blank space at the center legend of plate 95 engages the cog wheel when punch heads are positioned so that all but the final punch corresponding to 256 is in position, or when the passout appears when only the 256 punch is in position.

A holder 120 (FIG. 7) is provided for each duplicate board. It may be hingedly affixed to the reverse side of the board for outward swinging movement, for example, whereby the face of the card is normally concealed to preserve secrecy as to previous results.

The holder 120 has end flanges 121 within which a detachable rectangular frame 122 (FIG. 8) is accommodated. The frame 122 carries detents 123 registering with slots 124 in the end flanges of the cover. The card 10, previously placed in the holder as well as the holder itself, has pilot holes 125 for pins 126 projecting from the inner side of the frame 122. The card 10 is thus precisely aligned with the frame.

The frame 122 has a series of tapered recesses 127 along one end registering with ball detents 128 (FIG. 6) or the like provided on the punch mechanism to ensure accurate positioning of the card beneath the punch mechanism.

In operation, one punch mechanism is placed at each table, and after the board is played, the holder 120 is rotated outwardly and the score is appropriately handwritten.

Team numbers, corresponding to those at the left-hand side of the card 10 are provided at the corresponding side of the frame 122, and with this as a guide, the holder 120 is inserted into the punch mechanism beneath the support 103 and upon a base 130 spaced therefrom so that the North-South team number is opposite an index provided by the punch mechanism. The detents 128 secure the holder. The dial knob 99 is rotated until the result appears in window 96, whereupon the dial knob is pushed downwardly. The frame 98 carrying the counter 101 and head 107 descend upon the punch pins. The holder 120 is now moved so that the East-West team number is opposite the index, and the dial knob again pushed without being rotated.

Hinged tabs 140 may be provided to conceal all previous scores during actual use of the holder in accordance with championship rules. The tabs are all hinged at that portion of the frame corresponding to the left-hand edge of the punch card. The appropriate tab is lifted prior to insertion of the holder beneath the punch mechanism, and the score is handwritten in the appropriate column. The movable ends of the tabs are releasably latched at the opposite side of the frame 122. FIG. 9 illustrates a typical structure for the tabs 140. A hinge 160 is shown at one end of the tab 140. The other end of the tab carries a releasable latch 162.

After scoring by the electronic scoring machine is completed, the cards may be assembled and posted in order to permit the players to verify their results.

The dial mechanism, carrying spirally arranged legends, is particularly compact. This is essential in order to ensure against undue interference at the card table during play of duplicate boards.

The apparatus can also be used to score a so-called Howell or Scrambled Mitchell tournament in which pairs essentially shift into and out of both North-South and East-West or the two fields. In this instance, the teams punch their scores either on the top or bottom of the board according to the position played. When the mechanism totals the results, the total match point score for each team appears as two parts, one in the North-South counters, and another in the East-West counters. These are simply added together to provide final results.

Optionally, two cards may be supplied for each board, one card to be punched once for North-South competitors and the other for East-West competitors. In this case, the punching mechanism carries a different legend, reading in plus or minus scores rather than North-South scores and East-West scores. This necessitates shifting the punching mechanism to two positions; however, all the cards can then be run through the same device wherein all pins in the sensing box normally engage, for example. This makes possible one counter for each team, obviating adding two components of the total match point score.

An adhesive correcting tab 155 (FIG. 1) may be used to cover any row in the column 22 wrongly or improperly punched by the players using the punch apparatus. The punch device preferably applies a distinctive legend traversing all rows to indicate a dial scoring of the board.

I claim:

1. In match point duplicate scoring apparatus: a duplicate board; a data card holder secured to said duplicate board, said data card holder having provisions for exposing various areas of a data card held thereby; and individually operable means releasably mounted by said holder for concealing the said areas of said data card whereby the data card holder and the duplicate board can be passed from table to table by the participants of a duplicate bridge tournament so that a common data card for a particular duplicate bridge hand, and held by the holder can be encoded by the participants without revealing the results achieved by other participants.

2. In a match point duplicate bridge scoring apparatus: a data card having a series of separate areas allocated according to pair designations and to which indicia corresponding to scores may be applied; a holder providing separate spaces for playing cards corresponding to the compass positions; said holder having means for releasably retaining said data card as well as means for concealing the scores in succession after they are applied to the data card whereby said holder can be passed from table to table by the participants of a duplicate bridge tournament so that said data card can be encoded by the participants without revealing the results achieved by other participants.

References Cited
UNITED STATES PATENTS

| | | | |
|---|---|---|---|
| 2,079,437 | 5/1937 | Ehret | 234—52 |
| 2,698,053 | 12/1954 | Mantonya | 234—52 |
| 2,537,732 | 1/1951 | Angus | 235—61.12 |
| 2,650,024 | 8/1953 | Ferrin | 235—61.12 |
| 2,633,361 | 4/1953 | Cline | 273—151 |
| 2,006,521 | 7/1935 | Stone | 273—152 |
| 1,825,141 | 9/1931 | Brand | 235—61.9 |
| 2,531,142 | 11/1950 | Madison | 283—1 |

DARYL W. COOK, *Primary Examiner.*

MAYNARD R. WILBUR, *Examiner.*